United States Patent [19]

Antoniou

[11] Patent Number: 5,214,423

[45] Date of Patent: May 25, 1993

[54] RANDOM NUMBER GENERATION USING VOLATILE RAM

[75] Inventor: Theophilos Antoniou, Coral Springs, Fla.

[73] Assignee: Motorola, Inc., Schaumburg, Ill.

[21] Appl. No.: 688,793

[22] Filed: Apr. 22, 1991

[51] Int. Cl.$^5$ .............................................. H04B 1/00
[52] U.S. Cl. .................................. 340/825.5; 364/717
[58] Field of Search ............... 340/825.50, 825.07, 340/825.08, 825.10; 364/477, 717; 273/38 A, 86 R, 138 R, 143 R

[56] References Cited

U.S. PATENT DOCUMENTS

| 4,104,724 | 8/1978 | Dix et al. ........................... 364/477 |
| 4,667,191 | 5/1987 | Comroe et al. .................... 340/825.5 |
| 4,684,941 | 8/1997 | Smith et al. ...................... 340/825.52 |
| 4,992,783 | 2/1991 | Zdunek et al. ................... 340/825.34 |
| 4,994,803 | 2/1991 | Blackham ............................. 341/131 |
| 5,007,087 | 4/1991 | Bernstein et al. .................... 364/717 |

Primary Examiner—Sandra L. O'Shea
Assistant Examiner—Dervis Magistre
Attorney, Agent, or Firm—Juliana Agon

[57] ABSTRACT

A method (20) of generating a random number in a processor (2A-2N) which is associated with a volatile random access memory (RAM 4A-4N) is provided. When power is applied (22), the volatile contents of the RAM (4A-4N) are initially inspected (24). Based on the volatile contents of the RAM (26), a random time delay for the processor is generated (28).

7 Claims, 1 Drawing Sheet

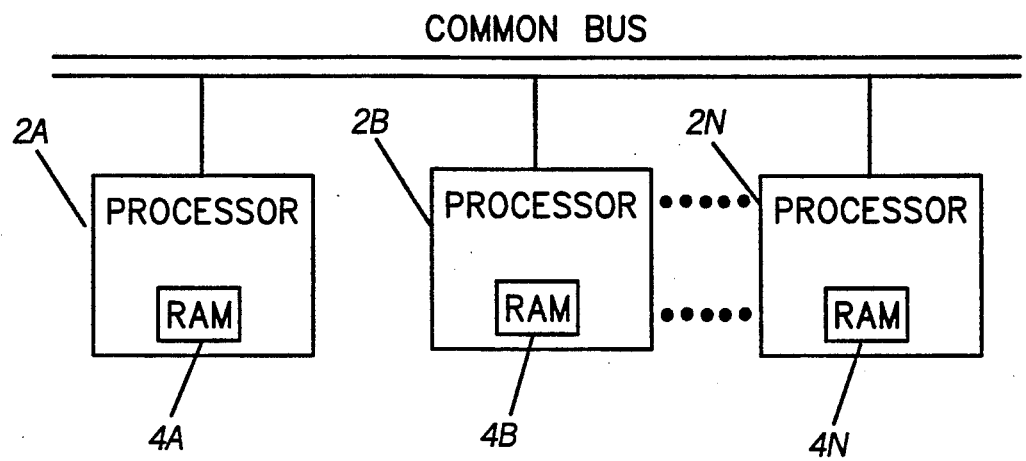
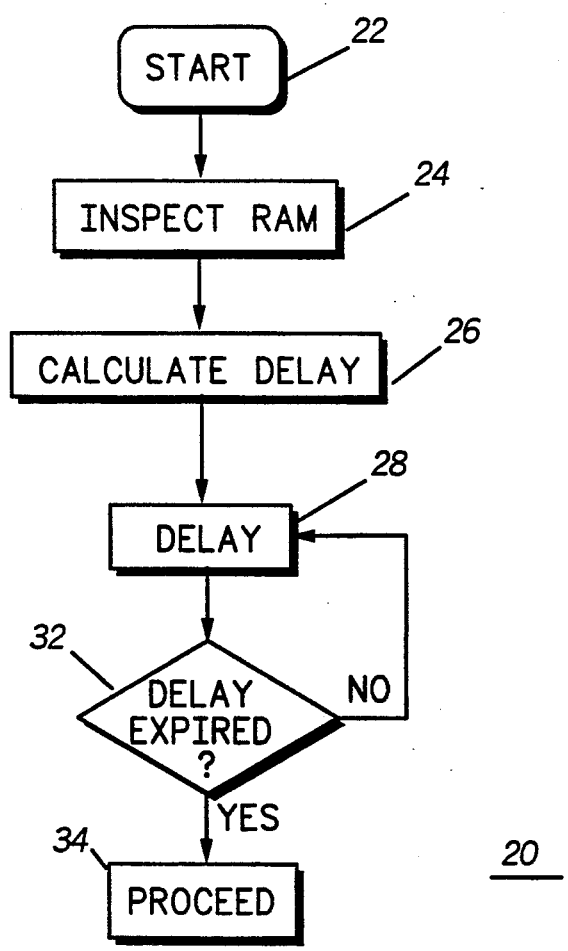

RANDOM NUMBER GENERATION USING VOLATILE RAM

TECHNICAL FIELD

This invention relates generally to random number generation and more particularly to random number generation for use with multiple processors.

BACKGROUND

Serial linkage of subsystems is at the heart of the architecture of the latest generation of two-way radios. The radios are constructed by interconnecting independent radio subsystems comprising individual processors over a bi-directional serial link. The undedicated multiple processors all communicating on the same serial link or bus, provide flexibility for radio design.

However, when two or more processors are present in such a system, where a common communication path (such as a bus, a disk or a multiplicity of lines) is used in which the processors communicate, problems arise at power-up or reset, when each processor tries to perform the same operations. Specifically, bus contention is one problem that arises in serially communicated information between radio subsystems or processors in an internally bussed two-way communication device, such as a portable or mobile radio. Bus contention is especially problematic if the processors in the system are all undefined, the same, or undedicated, where each processor can do the same task of a subsystem.

The simplest bus contention solution is simply to do nothing and assume the initialization software for each subsystem task of a processor will take different times to complete, such that the processors would not all be ready at the same time to access the bus. However, when accessing a slotted bus, the approach of doing nothing may not be reliable enough to avoid bus collisions. A slotted bus is one where the processors or transceiving devices addressing the bus must all do so at predetermined time slots, such as in a trunking environment. Therefore, the problem of bus contention is magnified if a slotted bus is used.

Many prior art systems utilize a randomized retry for a bus access after a busy bus condition is sensed, hoping that randomization will reduce the possibility of further collisions. In order to minimize further communications collisions, a random number is generated which causes a delay based on that random number for that processor to wait before retrying to send information on the common communication path. However, generating a random number is sometimes a difficult task, especially when the random number is needed immediately needed after power-up to determine which processor has access to the bus. Since a free running counter in a random number generator may have the same value every time at some point in the software such as during power-up or reset, randomness cannot be obtained. Generation is especially difficult if the processors do not have a EEPROM, any unused ports, or an A-to-D converter to generate the random number. Additionally, randomization would additionally require bus contention randomization overhead.

Therefore, in multiple access bus systems where multiple processors will access the bus, collision avoidance and bus contention must be anticipated and orchestrated.

SUMMARY OF THE INVENTION

The instant invention therefore simplifies bus contention during initial transmission and provides randomization before a bus collision has already occurred. Accordingly, the present invention provides a simple and reliable randomized delay for each processor on the same communication path.

Briefly, according to the invention, a method is provided for generating a random number in a processor which is associated with a volatile random access memory (RAM). When power is applied, the volatile contents of the RAM are initially inspected. Based on the volatile contents of the RAM, a random time delay for the processor is generated.

BRIEF DESCRIPTION OF THE DRAWINGS

FIG. 1 is a block diagram illustrating a serially-bussed subsystems of a radio system in which the preferred embodiment of the present invention is utilized.

FIG. 2 is an exemplary flow diagram of a random delay generation routine for the subsystem of FIG. 1.

DETAILED DESCRIPTION OF THE PREFERRED EMBODIMENT

Referring to FIG. 1, a block diagram illustrates a serially bussed radio system in which the preferred embodiment of the present invention is utilized. Transceiving devices, processors, or microprocessors 2A-2N which form the radio sub-systems of the radio system communicate on a common communication path, such as a bus, disk, or line 12. In the present embodiment, the processors 2A-4N may be mated to the serial bus 12 internal to or external to a radio or any other communication device. All the control and data is communicated on the serial bus 12, such that the serial bus 12 provides the physical interface of all the processors 2A-2N. The serial bus 12 consists of a two-wire link (signal and ground) and maybe bussed internal to a radio as well as external. When used externally, the cable may be a twisted pair, shielded audio, or fiber optic.

Each of the processors 2A-2N are associated with a random access memory (RAM) 4A-4N. The RAM 4A-4N may be internal or external to its respective processor 2A-2N. All of the processors 2A-2N may be similar or the same and need not have their own unique device address.

Referring to FIG. 2, an identical routine 20 is processed in each of the processors 2A-2N of FIG. 1 to generate a random delay based on the volatile state of the RAM 4A-4N initially when power is first applied at power-up or reapplied at reset. After the microprocessor 2A-2N is powered-up or reset (22), the processor 2A-4N reads the RAM contents in its own RAM (4A-4N).

The RAM 4A-4N is inspected at this step 24 to generate a random number called a "RAMdom" number for simplicity. Since when a processor looses the minimum required voltage to maintain any volatile RAM, that RAM is left in an indeterminate state. As is known, the leakage current and proximity of each RAM cell to either the $V_{DD}$ or $V_{SS}$ supply substrates are just a few of the attributes which influence whether the RAM cells float to a logical "one" or a "zero". As the processor ages and the RAM gets older, the leakage current of any one RAM cell also reduces. Therefore, over the lifetime of the processor, "RAMdom" numbers are even more likely. In this sense, the volatile attributes of each processor, act as an internal identification number for that processor, which differentiates it from all the other processors. Thus, when several processors are used, it is very unlikely that two or more processors will generate the same "RAMdom" number since each processor will have its RAM at a different volatile state.

This "RAMdom" number based on the volatile content of the RAM of each processor can thus be used to make each processor behave differently every time the processor powers up. Subsequently, in step 26, each of the processors 2A-2N may add up all the RAM contents of each cell in its own RAM 4A-4N to calculate a different delay for each of the processors 2A-2N. It is to be appreciated that other calculations based on the RAM contents, other than summing, may be used to generate a random delay. In step 28, a delay is generated based on the contents of the RAM to cause each of the processors 2A-2N to be delayed a different time before transmitting on the communication bus or path 12 and thereby reducing the possibility of bus collisions. Accordingly, in decision block 32, if the particular delay of the processor 2A-2N has not expired yet, that processor remains in a loop and returns to step 28 until its delay has expired. When it does, that processor may now proceed in step 34 to transmit on the communication path 12.

In summary, the present invention allows the connection of several processors that are exactly the same into a system without worrying about lock-up conditions at power-up and reset due to each processor performing the same task on a common communication path. This invention also eliminates the need of hardware jumpers, capacitors or other delay elements to sequence the power-up of independent processors in a common system. The present invention thus provides an optimized method of bus contention comprising an asyncronous bus access upon initial power-up or reset that is randomized based upon the randomized internal delays of each of the processors. The randomization comprises a variable time delay proportional to the volatile contents of the RAM. Thus, each processor will attempt to access the bus at a different time after power-up or reset.

What is claimed is:

1. A method of generating a random number in a processor associated with a random access memory (RAM), comprising the steps of:

inspecting initial unpredictable volatile contents of the RAM when power is first applied;

performing a logical operation on the initial unpredictable volatile contents of the RAM to generate a random number;

placing the processor in a program loop which takes a variable time to execute based on the random number for generating a randomized time delay; and attempting a bus access after the expiration of the randomized time delay.

2. The method of claim 1 wherein the performing logical operation step comprises summing the volatile contents of the RAM.

3. The method of claim 1 wherein the inspecting step comprises reading the volatile contents of the RAM initially at power-up.

4. The method of claim 1 wherein the inspecting step comprises inspecting the volatile contents of the RAM initially upon reset.

5. In a multi-access serial bus communication system having a plurality of transceiving devices each having an associated random access memory (RAM), a method of bus contention comprising the steps of:

inspecting, by each of the transceiving devices, initial unpredictable volatile contents of its own RAM when power is first applied;

performing a logical operation on the initial unpredictable volatile contents of said own RAM to generate a random number;

placing each of the transceiving devices in a program loop which takes a variable time to execute based on the random number for generating a randomized time delay; and attempting, by any transceiving device, a bus access after the expiration of the randomized time delay.

6. The method of claim 5 wherein said attempting step comprises attempting a time delay proportional to said accessing device's RAM volatile contents, whereby the plurality of transceiving devices sequentially attempt bus access one at a time.

7. The method of claim 5 wherein said attempting step comprises attempting a bit-time delay proportional to a summation of said accessing device's RAM volatile contents, whereby the plurality of transceiving devices sequentially attempt bus access one at a time.

* * * * *